US008625477B2

(12) United States Patent
Hakola et al.

(10) Patent No.: US 8,625,477 B2
(45) Date of Patent: *Jan. 7, 2014

(54) MULTICAST GROUPING

(75) Inventors: Sami-Jukka Hakola, Kempele (FI); Timo Koskela, Oulu (FI); Samuli Turtinen, Ii (FI)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/308,876

(22) Filed: Dec. 1, 2011

(65) Prior Publication Data

US 2012/0327835 A1    Dec. 27, 2012

(30) Foreign Application Priority Data

Jun. 23, 2011    (GB) .................................. 1110666.3

(51) Int. Cl.
*H04H 20/71* (2008.01)
*H04W 4/00* (2009.01)
*G06F 15/173* (2006.01)

(52) U.S. Cl.
USPC ........................... 370/312; 370/329; 709/223

(58) Field of Classification Search
USPC ................... 370/312; 455/3.01; 709/238–244
See application file for complete search history.

(56) References Cited

U.S. PATENT DOCUMENTS

| | | | |
|---|---|---|---|
| 2007/0286121 A1* | 12/2007 | Kolakowski et al. | 370/329 |
| 2010/0304685 A1 | 12/2010 | Wietfeldt et al. | |
| 2011/0010441 A1* | 1/2011 | Gutierrez | 709/223 |
| 2011/0039554 A1 | 2/2011 | Bims | 455/434 |
| 2011/0096770 A1 | 4/2011 | Henry | |
| 2011/0228666 A1 | 9/2011 | Barbieri et al. | |
| 2011/0287794 A1 | 11/2011 | Koskela et al. | |
| 2012/0039183 A1 | 2/2012 | Barbieri et al. | |
| 2012/0039284 A1 | 2/2012 | Barbieri et al. | |
| 2012/0063373 A1 | 3/2012 | Chincholi et al. | |
| 2012/0281594 A1 | 11/2012 | Stewart et al. | |

FOREIGN PATENT DOCUMENTS

| | | |
|---|---|---|
| WO | 2010/117998 | 10/2010 |
| WO | WO 2011/080610 A1 | 7/2011 |
| WO | WO 2011/115672 A1 | 9/2011 |

OTHER PUBLICATIONS

Ngo., "Resource Allocation for OFDMA-Based Cognitive Radio Multicast Networks with Primary User Activity Consideration", IEEE Transactions on Vehicular Technology, vol. 59, No. 4 (May 2010), (pp. 1668-1679)/.

(Continued)

*Primary Examiner* — Afshawn Towfighi

(57) ABSTRACT

A coexistence central entity CCE receives deployment messages from each of a plurality of N access nodes. Each deployment message has an identifier of an access node of the plurality and an identifier of a channel in a license-exempt band. From the received deployment messages the CCE compiles and maintains a database which associates each channel with a multicast group. Each multicast group includes all of the access nodes from which was received at least one deployment message identifying a said channel corresponding thereto. When the CCE receives a multicast message from one of the access nodes identifying a given channel, it checks the database to find members of a multicast group associated with the given channel, and notifies at least some of those members of the received multicast message. In this manner the access node's multicast message is forwarded among the whole group.

20 Claims, 5 Drawing Sheets

(56) References Cited

OTHER PUBLICATIONS

Chen, et al., "The Multicast Packing Problem", IEEE/ACM Transactions on Networking, vol. 8, No. 3, (Jun. 2008), (pp. 311-318).
P802.19.1, "Standard for Information Technology—Telecommunications and Information in Exchange Between Systems—Local and Metropolitan Area Networks—Specific Requirements—Part 19: TV White Space Coexistence Methods", (Oct. 13, 2009), (3 pages).
Phan, M-A, et al., "Flexible Spectrum Usage—How LTE Can Meet Future Capacity Demands", © Ericsson AB 2010, 28 pgs.
Yang, R., "Overview of Research Projects with NYU-Poly" © 2010 InterDigital, Inc., 20 pgs.
3GPP TS 23.402, V10.2.1 (Jan. 2011), "3$^{rd}$ Generation Partnership Project; Technical Specification Group Services and System Aspects; Architecture enhancements for non-3GPP accesses (Release 10)", 228 pgs.
Alex Reznik (Interdigital): Channel Selection Support in TVWS, 19-10-0104-00-001-channel-selection-support-in-tvws, IEEE Draft; 19-10-0104-00-001-Channel-Selection-Support-in-tvws, IEE-SA Mentor, Piscataway, NJ USA, vol. 802.19.1, Jul. 14, 2010, pp. 1-12, XP017661534, abstract p. 4-p. 11.
3GPP TS 23.402, V10.2.1 (Jan. 2011). 3rd Generation Partnership Project; Technical Specification Group Services and System Aspects; Architecture enhancements for non 3GPP accesses (Release 10), 228 pgs.
Alex Reznik (Interdigital): Channel Selection Support in TVWS, 19-10-0104-00-0001-channel-selection-support-in-tvws, IEEE Draft; 19-10-0104-00-0001-Channel-Selection-Support-In-TVWS, IEEE-SA Mentor, Piscataway, NJ USA, vol. 802.19.1, Jul. 14, 2010, pp. 1-12, XP017661534, abstract p. 4-p. 11.
Sachs et al.: "Flexible Spectrum Usage", Ericsson Eurolab R&D Ericsson Research, vol. Ericsson Research, Jul. 8, 2010, pp. 1-33, XP002685275, AAchen, Germany Retrieved from the Internet: URL:http://www.ikr.uni-stuttgart.dejContent/itgjfg524/ Meetingsj2010-07-08-Heidelberg/index.html [retrieved on Oct. 11, 2012].
Chen, et al. "The Multicast Packing Problem", IEEE/ACM Transactions on Networking vol. 8, No. 3 (Jun. 2008), (pp. 311-318).

\* cited by examiner

MULTICAST GROUPING

FIELD OF THE INVENTION

The exemplary and non-limiting embodiments of this invention relate generally to wireless communication systems, methods, devices and computer programs, and more specifically relate to coordinating among multiple access points of the same or different radio access technologies for communications on license-exempt radio spectrum, alternatively termed a shared band.

BACKGROUND OF THE INVENTION

The following abbreviations that may be found in the specification and/or the drawing figures are defined as follows:

| | |
|---|---|
| 3GPP | third generation partnership project |
| AP | access point |
| BS | base station |
| CCE | coexistence central entity |
| CCE-PE | coexistence central entity-peer entity |
| CM | coexistence manager |
| eNodeB | base station of a LTE/LTE-A system |
| FCC | Federal Communications Commission |
| ID | identifier |
| IEEE | Institute for Electrical and Electronics Engineers |
| IP | Internet protocol |
| ISM | industrial, scientific and medical |
| LTE | long term evolution (of the evolved UTRAN system) |
| LTE-A | long term evolution-advanced |
| MAC | medium access control |
| RAT | radio access technology |
| SBD-SN | shared band deployment support node |
| SSID | service set identifier |
| TV WS | television white spaces |
| UE | user equipment |
| UTRAN | universal terrestrial radio access network |
| WLAN | wireless local area network |

One approach to preventing congestion of cellular core networks due to the ever-increasing volume of wireless data and number of wireless users is to off-load some wireless traffic to non-cellular networks such as a WLAN, whose access points provide access to the Internet. However, such traffic off-load and anticipated gains from spectrum efficiency improvement is not expected to fully offset predicted data traffic increases. As a result, in addition to the more costly licensed spectrum there is discussion, among radio network operators and manufacturers of user handsets and network equipment, of utilizing license-exempt portions of the radio spectrum for wireless traffic. Such license-exempt spectrum is also termed the shared band or bands, and for example include the ISM band and the TV WS which the FCC in the United States is considering for this use.

In practice, such shared bands may be coordinated by the licensed spectrum systems, or they may be used by a stand-alone cell such as a LTE-A femto cell which provides fast access to the Internet in a similar manner to the WLAN specifications at IEEE 802.11. The advantage of a LTE-A femto cell over the traditional WLAN is the improved spectrum efficiency in LTE-A, realized through such concepts as LTE's flexibility in managing the deployment bandwidth, the number of utilized carriers, and even its flexible reconfiguration of center frequency.

The extension of LTE-A onto the shared band as well as certain problems that are anticipated for such an extension are discussed in a paper by M-A. Phan, H. Wiemann and J. Sachs of Ericsson Research entitled Flexible Spectrum Usage-How LTE Can Meet Future Capacity Demands [ITG FG 5.2.4 workshop, Jul. 8, 2008], and also in a summary of research by Rui Yang of InterDigital Communications LLC entitled Overview of Research Projects with NYU-Poly [Nov. 12, 2010].

One such problem is how to enable co-existence of multiple APs/BSs which deploy into the shared band by efficiently managing the potential interference therebetween. This interference problem exists regardless of whether different APs/BSs are operating on the same or different RATs since it is interference on the shared band which is the concern.

One conventional RAT-independent approach to manage such interference on the TV WS is to use a so-called a coexistence manager (CM), whose architecture is set forth by IEEE 802.19 Task group 1 and shown at FIG. 1. The CM is a function which operates on top of the radio access technologies. It has interfaces to other coexistence manager entities/servers. With the help of the CM, different RATs can negotiate the spectrum utilization between each other or submit to the control of a CM which locally governs the spectrum utilization for the shared spectrum.

SUMMARY OF THE INVENTION

In a first exemplary embodiment of the invention there is an apparatus comprising a processing system, for example in the form of at least one processor and at least one memory storing a computer program. In this embodiment the processing system is arranged to receive deployment messages from each of a plurality of N access nodes, each deployment message comprising at least an identifier of a given access node of the plurality and an identifier of a channel of a plurality of channels in a license-exempt band, wherein N is an integer greater than one; and from the received deployment messages, compile and maintain a database which associates each channel with a corresponding multicast group, each said multicast group comprising at least the access nodes from which was received at least one deployment message identifying a said channel corresponding thereto.

In a second exemplary embodiment of the invention there is a method comprising: receiving deployment messages from each of a plurality of N access nodes, each deployment message comprising at least an identifier of a given access node of the plurality and an identifier of a channel of a plurality of channels in a license-exempt band, in which N is an integer greater than one; and from the received deployment messages, compiling and maintaining a database which associates each channel with a corresponding multicast group, each said multicast group comprising at least the access nodes from which was received at least one deployment message a said channel corresponding thereto.

In a third exemplary embodiment of the invention there is a computer readable medium storing a computer program comprising a set of instructions which, when executed by a computing device, causes the computing device to perform the steps of:

receive deployment messages from each of a plurality of N access nodes, each deployment message comprising at least an identifier of a given access node of the plurality and an identifier of a channel of a plurality of channels in a license-exempt band, in which N is an integer greater than one; and from the received deployment messages, compile and maintain a database which associates each channel with a corresponding multicast group, each said multicast group comprising at least the access nodes from which was received at least one deployment message a said channel corresponding thereto.

These and other embodiments and aspects are detailed below with particularity.

DETAILED DESCRIPTION OF THE INVENTION

The term access node is used in the description below to be RAT independent, and includes an eNodeB of a LTE-A system, an access point AP of a WLAN system, a NodeB of a UTRAN system, a micro or femto access node, and the access nodes of other RATs. The access node provides wireless connectivity for one or more user devices to access a broader network such as the Internet or a publicly switched telephone network. In some RATs the access node may be embodied as a user device which takes on the function of providing access to other user devices, such as an AP-station in WLAN. Relay stations, remote radio heads, and other variations of a BS are also encompassed by the term access node.

Figure 1:
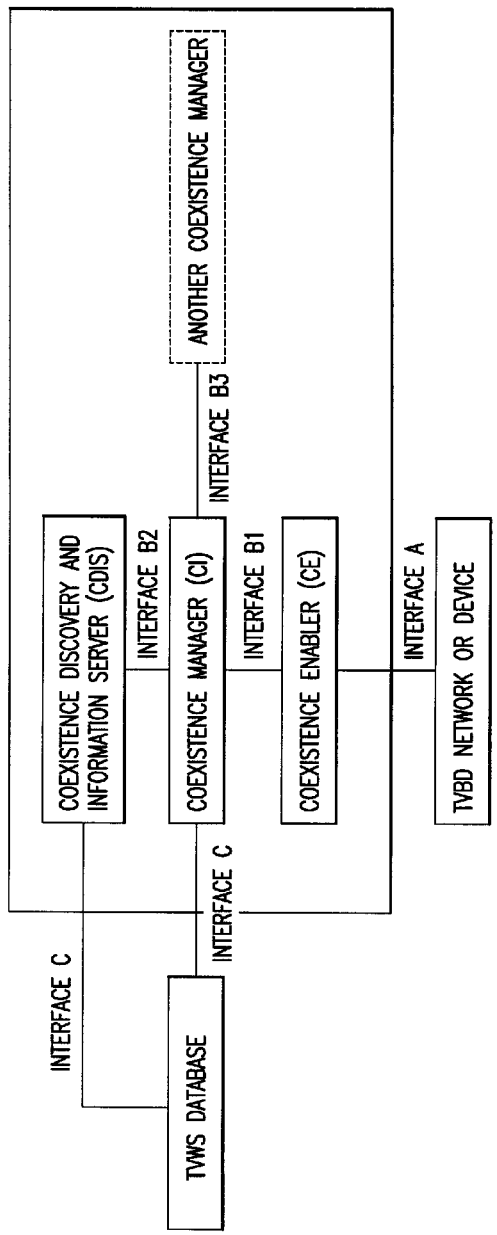
FIG. 1 illustrates the architecture for a coexistence manager as set forth in IEEE 802.19.1.
Figure 2:
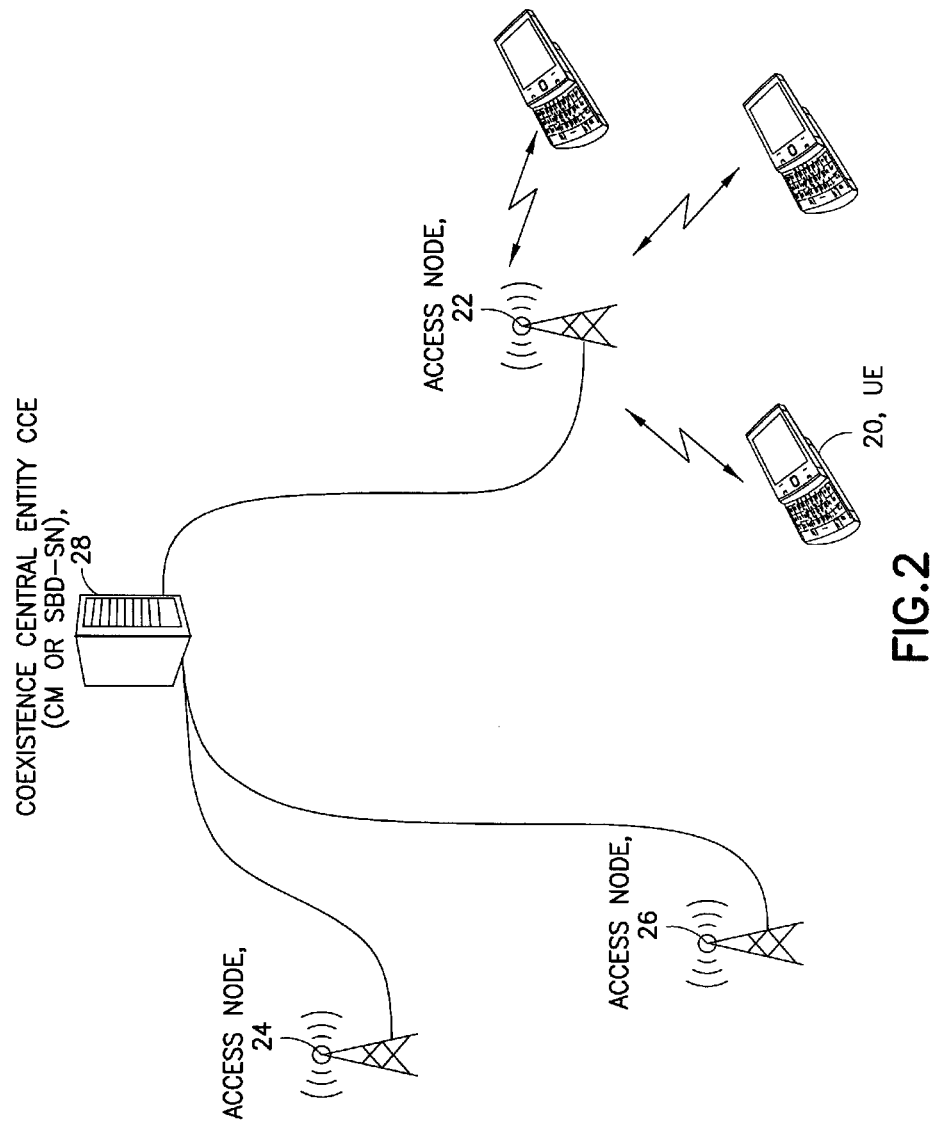
FIG. 2 is a schematic diagram illustrating an environment in which embodiments of the invention may be practiced to advantage.

An environment in which embodiments of the invention may be practiced with advantage is shown at FIG. 2. This exemplary arrangement includes three different access nodes 22, 24 and 26, which may be operating according to a similar RAT or according to two or more different types of RATs (e.g., LTE-A and WLAN). While each access node may be providing connectivity to one or user devices, for clarity of illustration such user devices or UEs 20 are shown only for access node 22. Each access node has a communication link with a co-existence central entity CCE 28 which may be embodied as a CM (see FIG. 1 and IEEE 802.19.1) or as a SBD-SN, to name just two possibilities. In other embodiments one of the access nodes or a higher level network node (such as a mobility management entity or serving gateway of an LTE-A system) may serve this CCE function. These links between access nodes 22, 24, 26 and the CCE 28 may be direct or may pass through other entities such as intermediary servers, and these links may be wired (including optical), wireless, or some combination of both. The following description provides details of communication between the first access node 22 and the second access node 24 with their respective UEs on the shared band, in such a way as to avoid causing interference to one another.

It is assumed that the first access node 22 selects a channel on a shared band. The first access node 22 then sends to the CCE 28 what is termed herein deployment information or a deployment message. In various exemplary embodiments the CCE 28 may be a CM as in IEEE 802.19.1 (see FIG. 1) or a network entity/server which takes on the functions of a SBD-SN. The deployment information which the first access node 22 sends in its deployment message includes the key parameters for its intended use of the shared band, such as for example the channel and the transmission power. This deployment message will also include an identifier of the first access node 22 which is sending the deployment message. So for example if the first access node 22 is a LTE eNodeB the node identifier may be its cell ID, whereas if the first access node 22 is a WLAN AP the node identifier may be its SSID. Other types of IDs may be used for access nodes operating in other types of RATs.

The identifier for the access node may be in the body of the deployment message itself. Or in an embodiment in which the communication link over which the deployment message passes from the first access node 22 to the CCE 28 uses an Internet protocol, the identifier may be in the message header as the sender address. In this case the identifier may be the first access node's web-based uniform resource locator/uniform resource identifier (URL/URI), and at least the first access node 22 would be pre-registered to the CCE 28 which has stored in its memory the cell ID or SSID which corresponds to that same first access node's URL/URI.

The deployment message may identify the channel in the shared band by a channel index, such as where there is a database of TV WS (or other shared band spectrum) similar to that illustrated in FIG. 1 which the various access nodes might consult to see which channels on the shared bandwidth might be less prone to interference. Alternatively the deployment message may identify the channel as a frequency band, such as center frequency and bandwidth or simply a frequency range.

Irrespective of how the access node identifier and the channel identification is indicated in the deployment message, the CCE 28 receives multiple ones of these deployment messages from multiple access nodes, and possibly any given access node may send multiple deployment messages for different channels in the shared band. In a general case it can be assumed that there is an integer number N of access nodes, and a finite number of channels in the shared band (which for the case the channels are indexed there may then be an integer number I of channels greater than one). In this arrangement the CCE 28 may receive one or more deployment messages from each of that plurality of N access nodes, each deployment message including an identifier of the $n^{th}$ access node from which it originated and an identifier of an $i^{th}$ channel in the shared band. These deployment messages may carry further information but the CCE 28 will use these two distinct pieces of information to build its database.

From all of these deployment messages which the CCE 28 receives, it assembles a database which associates each different $i^{th}$ channel with a multicast group, which is termed herein an $i^{th}$ multicast group since each $i^{th}$ channel has but one associated group. The members of any given multicast group include all of the access nodes from which the CCE 28 has received at least one deployment message with the identifier of the $i^{th}$ channel. The CCE 28 maintains the database by dropping from various multicast groups those access nodes whose deployment message for the relevant $i^{th}$ channel is outdated. In one embodiment a given $i^{th}$ channel becomes outdated when a specific end-time specified within the deployment message for use of that channel has passed. In another embodiment a given $i^{th}$ channel becomes outdated when the CCE 28 receives from the access node a dissociation message. A third embodiment is a combination of the two: normally the channel becomes outdated due to the dissociation message, but if either a time in the deployment message itself or some default time period elapses without the CCE 28 receiving a dissociation message for that channel, the CCE 28 renders the relevant channel outdated by default. In this way the CCE 28 creates and maintains the multicast group based on the occupied channels on the shared band.

Figure 3:
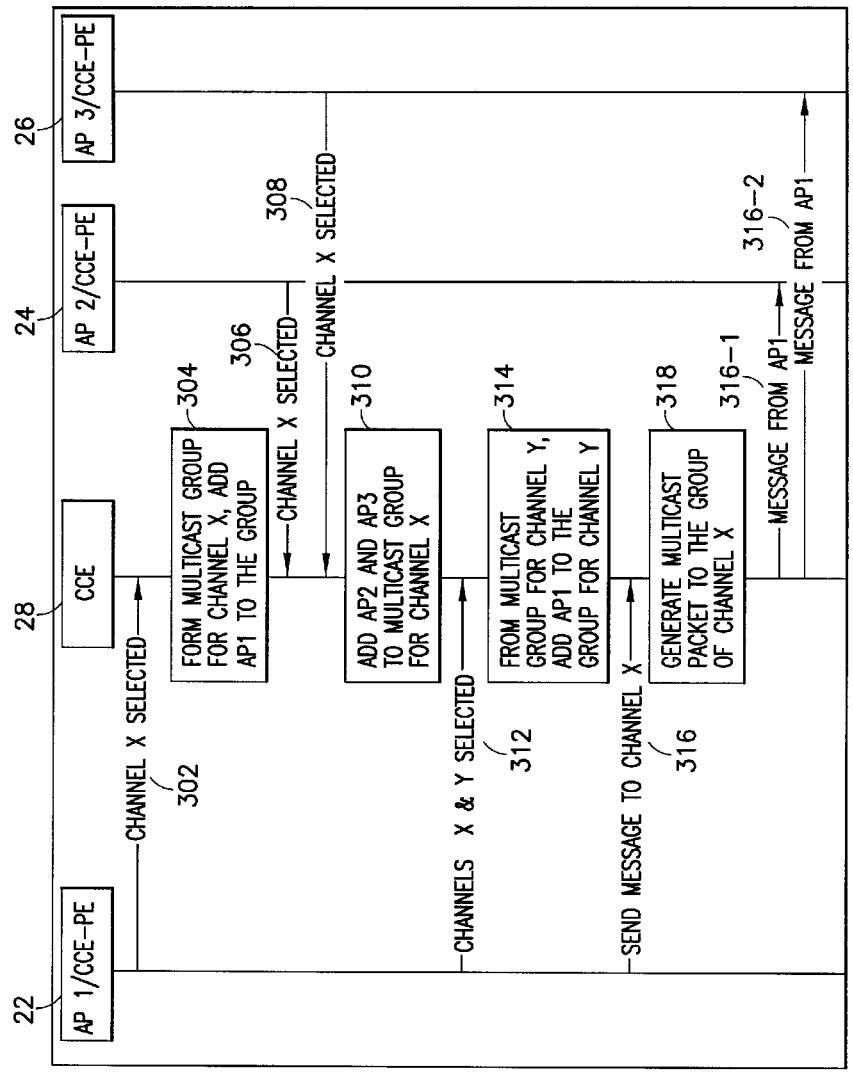
FIG. 3 is a signaling diagram illustrating channel selection, creation of multicast groups therefrom, and distribution of channel utilization information to members of the relevant multicast group according to an exemplary embodiment of the invention.

This is shown in the signaling diagram of FIG. 3, which uses similar reference numbers for the three access nodes 22, 24 and 26 as does FIG. 2 as well as for the CCE 28. The three access nodes 22, 24, 26 may alternatively be termed CCE-PEs as listed at FIG. 3. In the description above as well as that related to FIG. 4 below, N is used to designate a plurality of access nodes. In FIG. 3, X as well as Y are used to designate two different channels in the shared band.

The first access node 22 selects channel X in the shared band for use with its UEs 20 and sends a deployment message 302 to the CCE 28 identifying channel X and itself. At block 304 the CCE 304 sees that there is no pre-existing multicast group for channel X and so the CCE 28 creates one, with the first access node 22 as its only member. Then the CCE 28 receives another deployment message 306 which also identifies channel X and which further identifies the second access node 24. The CCE 28 receives a third deployment message 308 identifying channel X and the third access node 26. From these two additional messages 306, 308 the CCE 28 adds at block 310 to the existing multicast group for channel X two new members, the second and third access nodes 24, 26.

The first access node 22 subsequently sends another deployment message 312 identifying itself as well as channel X and channel Y, both in the shared band (this may be because the first access node 22 wants to use frequency-adjacent channels at the same time). Alternatively this deployment message 312 may identify a center frequency and bandwidth which happens to span at least portions of both channel X and channel Y. Upon receiving this deployment message 312 the CCE 28 consults its database and sees that the first access node 22 is already a member of the multicast group associated with channel X and so does nothing further for that multicast group. The CCE 28 further sees that there is no pre-existing multicast group for channel Y and so it creates one, with the first access node 22 as its only member.

Assuming these four deployment messages are the only ones received by the CCE 28, then the content of the database is as follows (in which the database utilizes at least the RAT-specific identifier for the various access node members):

| Channel ID | Multicast members |
|---|---|
| Channel X | first access node 22 |
|  | second access node 24 |
|  | third access node 26 |
| Channel Y | first access node 22 |

The remaining steps and messages shown in FIG. 3 relates to the distribution of information concerning use of the shared band channel(s) by an access node. More specifically, the first access node 22 sends a multicast message 316 to the CCE 28. This message 316 is not multicast directly by the first access node 22 which originally created and sent it, but only later by the CCE 28. In the FIG. 3 embodiment this original multicast message is addressed to channel X. At block 318 the CCE 24 enters the database with channel X from the multicast message 316, reads the identifiers of all members of the multicast group associated with channel X, and forwards the first access node's multicast message to all members of that multicast group at messages 316-1 and 316-2. In another embodiment the multicast message 316 is forwarded 316-1, 316-2 to all members of the corresponding multicast group except the access node member from which the multicast message 316 was originally received, or only to members which are within a certain geographic proximity to the sending first access node 22.

Different addressing systems are possible for the frequency channel-to-multicast address mapping performed by the CCE 28 at block 318, depending on which types of addresses the CCE 28 is using in its database. In one embodiment this mapping (which obtains the addresses for the forwarded multicast messages 316-1, 316-2) are IPv4 or IPv6 addresses, and/or Ethernet MAC addresses. In another embodiment this mapping uses RAT-specific addresses to which are sent the forwarded multicast messages 316-1, 316-2, such as radio network temporary identifiers RNTIs for the LTE system. The database may have different address types for different access nodes, and so in one implementation one or more of the forwarded multicast messages 316-1, 316-2 may be addressed to an IPv4/IPv6 address while other addressees of the same forwarded multicast messages 316-1, 316-2 may be RNTIs.

In one implementation, all of the messages shown in FIG. 3 are sent on the channel which they identify: messages 302, 306, 308, 316, 316-1 and 316-2 are sent on channel X; and message 312 may be two distinct messages of which one is sent on channel X and the other is sent on channel Y or it may be one message sent near the center frequency of both those (adjacent) channels. In another implementation the deployment messages are communicated to the CCE 28 over a control link which is not on the shared band (e.g., a wired Internet connection or control link passing through higher network nodes such as a mobility management entity) but the multicast messages are transmitted on the channel to which they are respectively addressed, which in the FIG. 3 example is channel X for multicast message 316. For implementations in which the different access nodes are operating on different RATs they may not have the capability to communicate with one another wirelessly, in which case the deployment messages 302, 306, 308, 312 as well as the multicast messages 316, 316-1, 316-2 are for example sent on wired digital subscriber line DSL connections to each access node or for the case the CCE 28 is multi-RAT capable a wireless backhaul connection for each access node (which for robustness are preferably not on the shared band channels).

Each of these options offers two advantages. First, apart from identifying an appropriate channel in the shared band (which might involve consulting a TV WS database or similar as in FIG. 1), no access node needs to monitor any shared band channel until it sends its own deployment message identifying that shared band. Second, no access node needs to blind detect on that shared channel to find out if other access nodes are using it since they are able to read the forwarded multicast message 319-1, 319-2 which is addressed to their RAT-specific ID (or other unique ID).

In this manner any access node occupying a certain channel in the shared band may communicate with other systems/access nodes on that specific channel by indicating the channel number (such as a TV channel, which implicitly maps to a certain part of the shared band spectrum), or by indicating a center frequency and bandwidth (which might be considered to be a carrier spanning over multiple TV channels or a virtual channel on the shared spectrum). The CCE 28 receives the multicast message 316 from an access node 22 which is addressed to a specific channel (X) or frequency in the shared spectrum. The CCE 28 has a mapping entity which records the channel utilization by different access nodes 22, 24, 26 and creates an address table for each channel so it can create a multicast message 316-1, 316-2 addressed to the correct recipient access nodes 24, 26.

The access node 22 which occupies a channel (X) on the shared spectrum can transmit higher layer messages 316-1 and 316-2 in a multicast manner, via message 316 and the CCE 28, to other access points 24, 26 occupying the same channel (X) by using the channel number as an address reference for the CCE 28 to utilize in accessing its database. Upon receiving the multicast message 316 from an access node 22 the CCE 28 checks the channel number and generates the multicast message which it forwards to the access node addresses which are associated in the database with the channel number reference.

In another embodiment, the CCE 28 constructs the database as detailed above for FIG. 3, but when distributing at 316-1 and 316-2 the multicast message 316 it received from the first access node 22 it restricts those to whom it sends the re-transmission to those access nodes which lie within a pre-determined geographic proximity to the access node 22 from which the multicast message 316 was received. This more limited re-transmission of the multicast message may also exclude the access node 22 from which the CCE 28 originally received the multicast message 316. The CCE 28 may filter the multicast group for this purpose based on geographic location information which the individual access nodes 22, 24, 26 provide (and which the CCE 28 also stores in its database). In this manner the CCE 28 restricts its channel multicast message forwarding to only a certain geographic area rather than to all members of the multicast group regardless of the minimal interference potential from more remote nodes.

By means of the embodiment described with reference to FIG. 3 the multicast groups based on the channel occupancy can be used for interference coordination and management between different access nodes. When considering a scenario in which access nodes on the same shared-band channel are uncoordinated with one another (such as femto cells), such uncoordinated access nodes can exchange information via multicasting to the specific channel utilizing the distribution procedure at FIG. 3, but in this case the information which is included in the multicast message 316 may be for forming neighbor relations among the different uncoordinated femto cells in the vicinity.

Embodiments of the invention as described by example above, and particularly the channel-specific multicast groupings, provide the technical effect of enabling an efficient communication mechanism among frequency-coexisting access nodes 22, 24, 26 and possibly even different RAT systems on the same shared band radio resources. It is the CCE 28 which coordinates this efficient communication mechanism.

Figure 4:
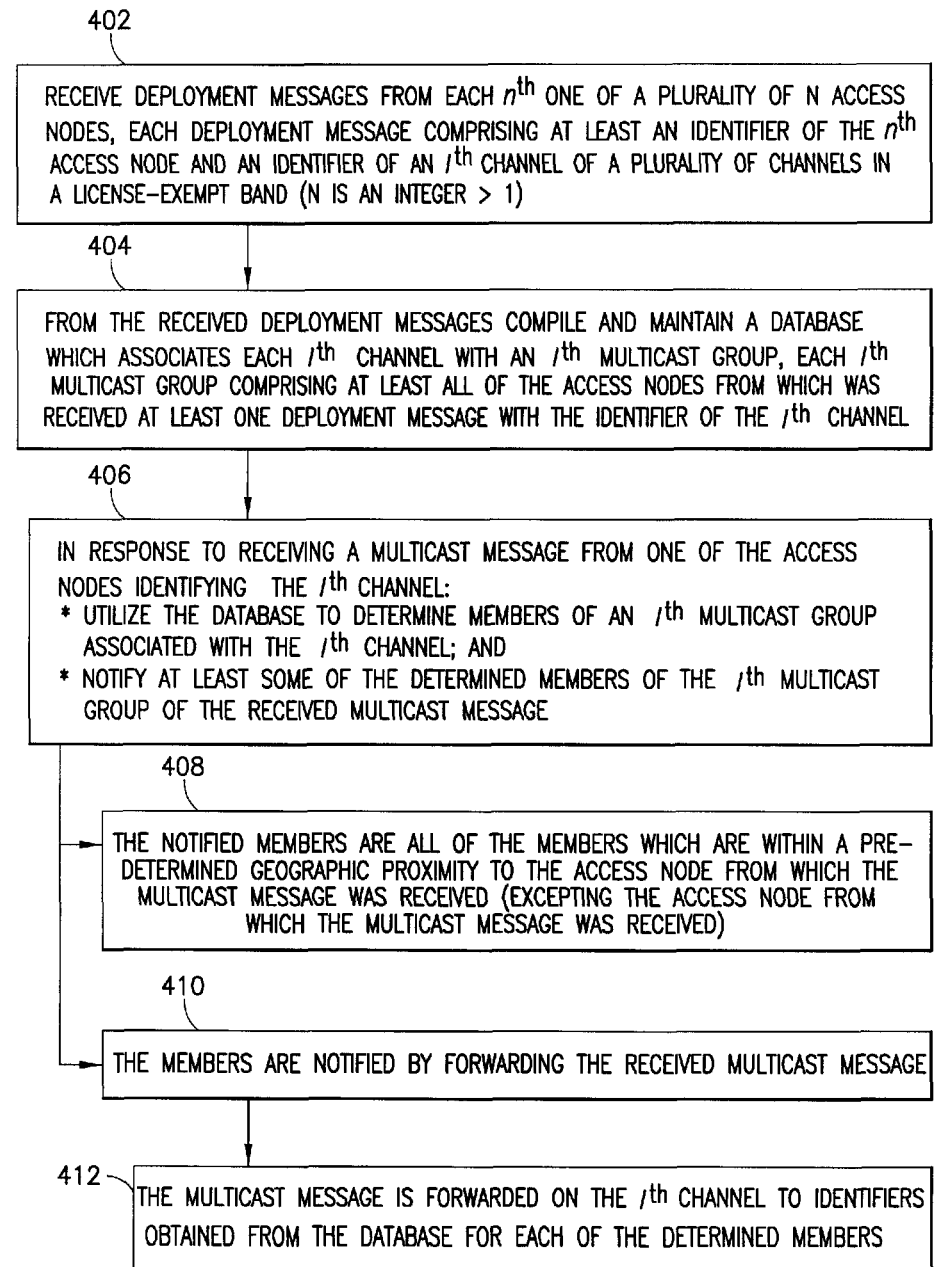
FIG. 4 is a logic flow diagram that illustrates the operation of a method, and a result of execution of computer program instructions embodied on a computer readable memory, in accordance with the exemplary embodiments of this invention.

FIG. 4 above is a logic flow diagram which describes an exemplary embodiment of the invention from the perspective of the CCE 28. FIG. 4 represents steps executed by a computer program or an implementing algorithm stored in the local memory of the CCE 28, as well as illustrating the operation of a method and a specific manner in which the CCE 28 (or one or more components thereof) are configured to cause that CCE/electronic device to operate. The various blocks shown in FIG. 4 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Blocks 402 and 404 relate to building of the database from multiple deployment messages that are received by the CCE 28, and block 406 relates to distribution of a given multicast message which the CCE also receives. At block 402 the CCE 28 receives deployment messages from each of a plurality of N access nodes, each deployment message comprising at least an identifier of a given access node of the plurality and an identifier of a channel of a plurality of channels in a license-exempt band (N is an integer greater than one). Note that there may be more than N access nodes cooperating through the one CCE 28, but in the FIG. 4 example only N of them are currently participating. Then at block 404, the CCE compiles and maintains a database from the received deployment messages: the database associates each channel with a corresponding multicast group, and each multicast group comprises at least all of the access nodes from which was received at least one deployment message identifying a said channel corresponding thereto.

Information distribution at block 406 finds the CCE 28, in response to receiving a multicast message from one of the access nodes (e.g., first access node 22) identifying a given channel, taking two distinct steps: utilizing the database to determine members of the multicast group associated with the given channel (which in FIG. 3 include access nodes 24 and 26); and notifying at least some of the determined members of the multicast group corresponding to the received multicast message. Block 406 is optional in that there are other ways to utilize the created database.

As detailed for FIG. 3, the compiled database of block 402 comprises an address table for the identifier of each channel. The CCE 28 utilizes the database to determine members of a given multicast group at block 406 by accessing the database on the basis of the channel to which the received multicast message is addressed. The members of the relevant multicast group are identified in the database itself by at least identifiers of a type specific to a RAT in which the respective member operates (e.g., RNTI for LTE, SSID for WLAN).

Further portions of FIG. 4 are directed towards specific implementations and embodiments which are also optional. Assuming the information distribution from block 406, then at block 408 the members of the multicast group which are notified at block 406 are only those members which are within a pre-determined geographic proximity to the access node (22) from which the multicast message was received. As noted above it may be inefficient to include the sender of the multicast message in the multicast forwarding of that same message, so in parentheses at block 408 the access node (22) from which the multicast message itself was originally received is excluded from the notifying.

Block 410 indicates that the notifying of block 406 is via message forwarding, mentioned above. Forwarding is not the only way to distribute this information; the CCE 28 may re-cast the received multicast message into a new format so that what is distributed is not an exact copy of what was received with only addressees changed.

At block 412 the multicast message received on the channel identified at step 406 is forwarded to the members whose identifiers obtained from the database. As detailed above those addresses from the database may be RAT-specific and/or IPv4/IPv6 and/or ethernet MAC addresses.

Figure 5:
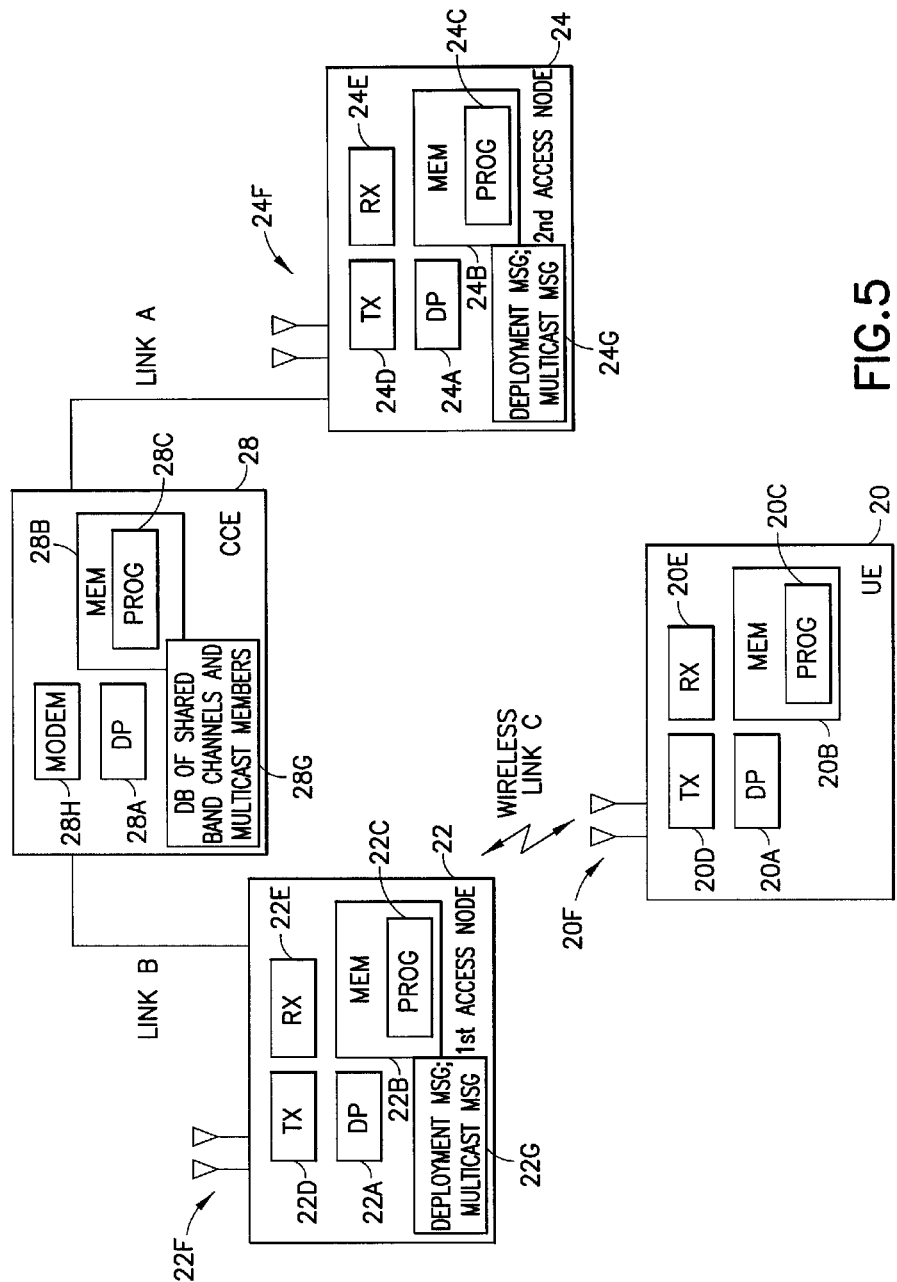
FIG. 5 is a simplified block diagram of various network devices and a UE similar to those shown at FIG. 2, which are exemplary electronic devices suitable for use in practicing the exemplary embodiments of the invention.

Reference is now made to FIG. 5 for illustrating a simplified block diagram of various electronic devices and apparatus that are suitable for use in practicing the exemplary embodiments of this invention. In FIG. 5 a first access node 22 is adapted for communication over a wireless link C with a mobile apparatus, such as a mobile terminal or UE 20. The first access node 22 may be a macro eNodeB, a WLAN AP, a femto eNodeB, or other type of BS or AP.

For completeness, the UE 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with the first access node 22 via one or more antennas 20F.

The first access node 22 similarly includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. There is a data and/or control path, termed at FIG. 5 as link A, coupling the first access node 22 with the CCE 28 and over which the first access node 22 sends its own deployment messages 302 and originating multicast messages 316, and/or over which it receives forwarded multicast messages 316-1, 316-2 concerning the shared/license-exempt bands. The first access node 22 stores this radio resource deployment information 22G concerning the license-exempt band in its local MEM 22B so as to avoid interfering with other access nodes for which the first access node 22 has received a forwarded multicast message as detailed above.

Similarly, the CCE 28 includes processing means such as at least one data processor (DP) 28A, storing means such as at least one computer-readable memory (MEM) 28B storing at least one computer program (PROG) 28C, and communicating means such as a modem 28H for bidirectional communication with the first access node 22 via the link A and also with the second access node 24 over the other link B. While not particularly illustrated for the UE 20 or first access node 22 or second access node 24, those devices are also assumed to include as part of their wireless communicating means a modem which may be inbuilt on a radiofrequency RF front end chip within those devices 20, 22, 24 and which chip also carries the TX 20D/22D/24D and the RX 20E/22E/24E. The CCE 28 also has stored in its local memory at 28G the database which it constructs and maintains as detailed above and listing the multicast group members corresponding to each channel in the shared band.

The second access node 24 includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E for bidirectional wireless communications with other UEs under its control via one or more antennas 24F. There is a data and/or control path, termed as link B, coupling the second access node 24 with the CCE 28 and over which the second access node 24 sends its own deployment and multicast messages and/or receives forwarded multicast messages 316-1, 316-2 concerning the shared/license-exempt bands. The second access node 24 stores at 24G in its local MEM 24B messages and shared band deployment information similar to those described above for the first access node 22.

At least one of the PROGs 28C in the CCE 28 is assumed to include program instructions that, when executed by the associated DP 28A, enable the device to operate in accordance with the exemplary embodiments of this invention, as detailed above. The first and second access nodes 22, 24 also have software stored in their respective MEMs to implement certain aspects of these teachings. In these regards the exemplary embodiments of this invention may be implemented at least in part by computer software stored on the MEM 28B, 22B, 26B which is executable by the DP 28A of the CCE 28 and/or by the DP 22A/24A of the respective access nodes 22, 24, or by hardware, or by a combination of tangibly stored software and hardware (and tangibly stored firmware). Electronic devices implementing these aspects of the invention need not be the entire devices as depicted at FIG. 5, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 22B, 24B and 28B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 24A and 28A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The invention claimed is:

1. An apparatus comprising:
at least one processor and a computer readable memory storing a computer program, wherein the computer readable memory with the computer program is configured with the at least one processor to cause the apparatus to at least:
receive deployment messages from each of a plurality of N access nodes each of which is operable to provide wireless connectivity to one or more user devices, each deployment message comprising at least an identifier of a given access node of the plurality and a frequency identifier or a frequency channel of a plurality of frequency channels a license-exempt band, wherein N is an integer greater than one; and
from the received deployment messages, compile and maintain a database which associates each frequency channel with a corresponding multicast group, each said multicast group comprising at least the access nodes from which was received at least one deployment message identifying a said frequency channel corresponding thereto.

2. The apparatus according to claim 1 wherein the computer readable memory with the computer program is configured with the at least one processor to cause the apparatus to:
in response to receiving a multicast message from one of the access nodes identifying a said frequency channel, utilize the database to determine members of a multicast group associated with the frequency channel; and
notify at least some of the determined members of the multicast group corresponding to the received multicast message.

3. The apparatus according, to claim 2, wherein the determined members of the multicast group which are notified of the received multicast message are all members of the multicast group which are within a pre-determined geographic proximity to the access node from which the multicast message was received, excepting the access node from which the multicast message was received.

4. The apparatus according to claim 2, wherein the at least some of the determined members of the multicast group are notified of the received multicast message by forwarding the received multicast message.

5. The apparatus according to claim 2, wherein the compiled database comprises an address table for each frequency identifier of each frequency channel, and the processing system is arranged to utilize the database to determine the members of the multicast group associated with the frequency channel by accessing the database using the frequency channel to which the received multicast message is addressed.

6. The apparatus according to claim 5, wherein the members of the multicast group are identified in the database by at least identifiers of a type specific to a radio access technology in which the respective member operates.

7. The apparatus according to claim 2, wherein:
the multicast message is received on a given frequency channel; and
the at least some of the determined members of a multicast group corresponding to the given frequency channel are notified of the received multicast message by forwarding the received multicast message on the given frequency channel to identifiers obtained from the database for each of the at least some of the determined members.

8. A method, comprising:
receiving deployment messages from each of a plurality of N access nodes each of which is operable to provide wireless connectivity to one or more user devices, each deployment message comprising at least an identifier of as given access node of the plurality and a frequency identifier of a frequency channel of a plurality of frequency channels in a license-exempt band, in which N is an integer greater than one; and
from the received deployment messages, compiling and maintaining a database which associates each frequency channel with a corresponding multicast group, each said multicast group comprising at least the access nodes from which was received at least one deployment message identifying a said frequency channel corresponding thereto.

9. The method according to claim 8, further comprising:
in response to receiving a multicast message from one of the access nodes identifying a said frequency channel, utilizing the database to determine members of a multicast group associated with the frequency channel; and
notifying at least some of the determined members of the multicast group corresponding to the received multicast message.

10. The method according to claim 9, in which the determined members of the multicast group which are notified of the received multicast message are all members of the multicast group which are within a pre-determined geographic proximity to the access node from which the multicast message was received, excepting the access node from which the multicast message was received.

11. The method according to claim 9, in which the at least some of the determined members of the multicast group are notified of the received multicast message by forwarding the received multicast message.

12. The method according to claim 9, in which the compiled database comprises an address table for each frequency identifier of each frequency channel, and utilizing the database to determine the members of the multicast group associated with the frequency channel comprises accessing the database using the frequency channel to which the received multicast message is addressed.

13. The method according to claim 12, in which the members of the multicast group are identified in the database by at least identifiers ala type specific to a radio access technology in which the respective member operates.

14. The method according to claim 9, in which:
the multicast message is received on a given frequency channel; and
the at least some of the determined members of a multicast group corresponding to the given frequency channel are notified of the received multicast message by forwarding the received multicast message on the given frequency channel to identifiers obtained from the database for each of the at least some of the determined members.

15. A Computer readable memory storing a computer program which, when executed by a computing device, causes the computing device to perform the steps of:
receive deployment messages from each of a plurality of N access each of which is operable to provide wireless connectivity to one or more user devices, each deployment message comprising at least an identifier of a given access node of the plurality and a frequency identifier of a frequency channel of a plurality of frequency channels in a license-exempt band, in which N is an integer greater than one; and
from the received deployment messages, compile and maintain a database which associates each frequency channel with a corresponding multicast group, each said multicast group comprising at least the access nodes from which was received at least one deployment message identifying a said frequency channel corresponding thereto.

16. The computer readable memory according to claim 15, wherein the executed computer program further causes the computing device to:
in response to receiving a multicast message from one of the access nodes identifying a said frequency channel, utilize the database to determine members of a multicast group associated with the frequency channel; and
notify at least some of the determined members of the multicast group corresponding to the received multicast message.

17. The computer readable memory according to claim 16, in which the determined members of the multicast group that are notified of the received multicast message are all members of the multicast group that are within a pre-determined geographic proximity to the access node from which the multicast message was received excepting the access node from which the multicast message was received.

18. The computer readable memory according to claim 16, in which the members of the multicast group are identified in the database by at least identifiers of a type specific to a radio access technology in which the respective member operates.

19. The computer readable memory according to claim 16, in which the compiled database comprises an address table for each frequency identifier of each frequency channel; and in which the set of instructions causes the computing device to utilize the database to determine the members of the multicast group associated with the frequency channel by accessing the database using the frequency channel to which the received multicast message is addressed.

20. The computer readable memory according to claim 16, in which:
   the multicast message is received on a given frequency channel; and
   the at least some of the determined members of the multicast group corresponding to the given frequency channel are notified of the received multicast message by forwarding the received multicast message on the frequency channel to identifiers obtained from the database for each of the at least some of the determined members.

* * * * *

UNITED STATES PATENT AND TRADEMARK OFFICE
CERTIFICATE OF CORRECTION

| | | |
|---|---|---|
| PATENT NO. | : 8,625,477 B2 | Page 1 of 1 |
| APPLICATION NO. | : 13/308876 | |
| DATED | : January 7, 2014 | |
| INVENTOR(S) | : Sami-Jukka Hakola, Timo Koskela and Samuli Turtinen | |

It is certified that error appears in the above-identified patent and that said Letters Patent is hereby corrected as shown below:

In the Claims

Claim 1 at Column 10, line 58, replace "identifier or a frequency channel" with --identifier of a frequency channel--.

Claim 1 at Column 10, line 59, replace "channels a license-exempt" with --channels in a license-exempt--.

Claim 8 at column 11, line 47, replace "as given acces node" with --a given access node--.

Claim 13 at column 12, line 20, replace "ala" with --of a--.

Claim 17 at column 12, line 64, replace "received excepting" with --received, excepting--.

Signed and Sealed this
Eighteenth Day of March, 2014

Michelle K. Lee
*Deputy Director of the United States Patent and Trademark Office*